United States Patent [19]

McArdle et al.

[11] 3,924,038

[45] Dec. 2, 1975

[54] FRAGMENT SUPPRESSION CONFIGURATION

[75] Inventors: Edward H. McArdle, Media, Pa.;
Ralph John Millidge, Florissant, Mo.

[73] Assignee: The United States of America as represented by the Secretary of the Air Force, Washington, D.C.

[22] Filed: June 12, 1974

[21] Appl. No.: 478,810

[52] U.S. Cl. .................. 428/49; 2/2.5; 89/36 A; 109/49.5; 428/238; 428/251; 428/252; 428/285; 428/474; 428/411
[51] Int. Cl.² .......................................... B32B 7/02
[58] Field of Search ......... 161/79, 82, 88, 152, 156, 161/404, 36, 92, 227, 93; 2/2.5; 89/36 A; 109/49.5; 428/49

[56] References Cited
UNITED STATES PATENTS

| | | | |
|---|---|---|---|
| 3,320,619 | 5/1967 | Lastnik et al. | 161/404 |
| 3,444,033 | 5/1969 | King | 161/38 |
| 3,700,534 | 10/1972 | Cook | 161/38 |
| 3,722,355 | 3/1973 | King | 161/404 |

*Primary Examiner*—George F. Lesmes
*Assistant Examiner*—James J. Bell
*Attorney, Agent, or Firm*—Joseph E. Rusz; Arthur R. Parker

[57] ABSTRACT

A lightweight fragmentation suppression or ballistic shieldprotective system including a blanket portion composed of at least two layers of ballistic nylon felt interposed with an inner lamination or ply and enclosed within a ballistic nylon cloth envelope. A prime protective-surface or layer composed of a ceramic or tile assembly, incorporating a plurality of individual, slightly spaced tiles each mounted with its face side bonded to an overlapping double-layer glass cloth and its rear side covered with a separate metal back plate, is bonded with the said metal back plate side and overlapping portions of the glass cloth against the face side of the blanket.

6 Claims, 8 Drawing Figures

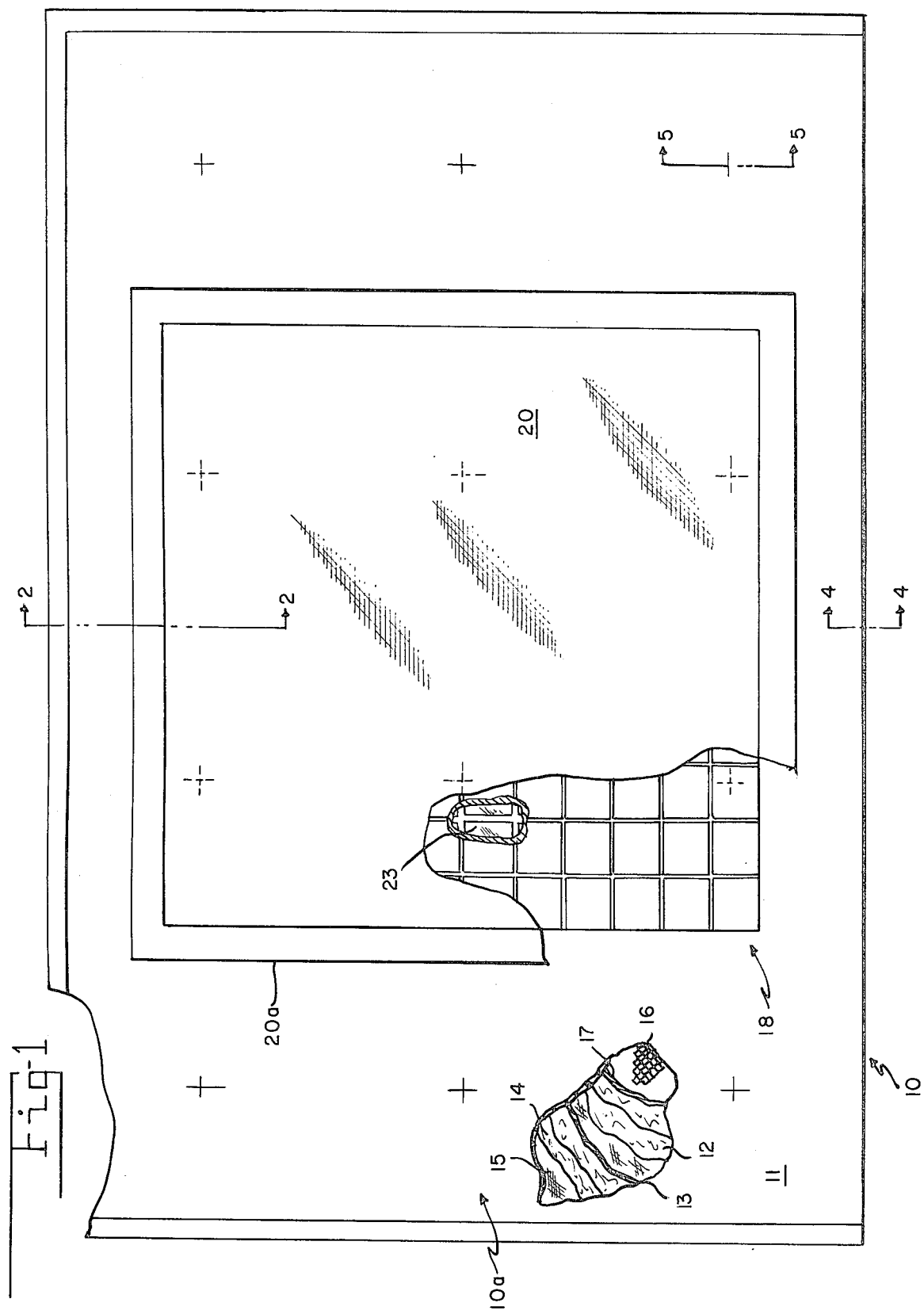

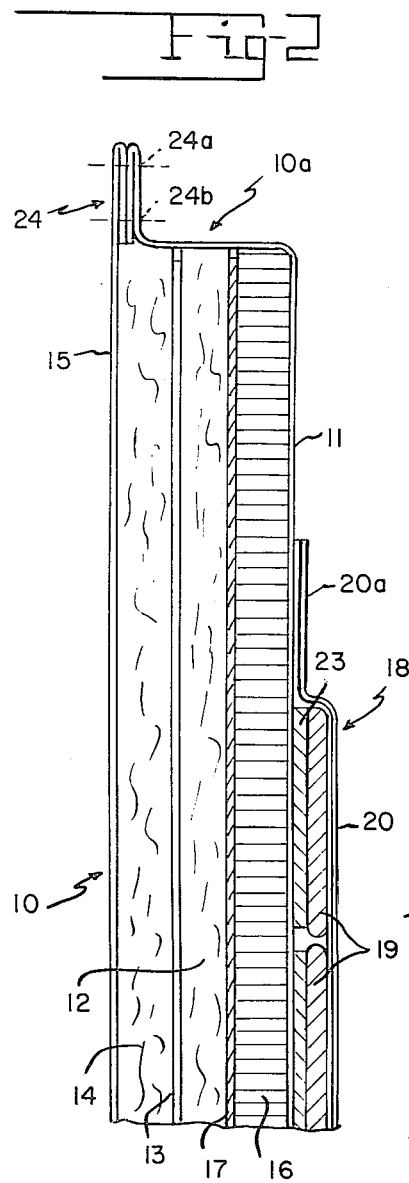
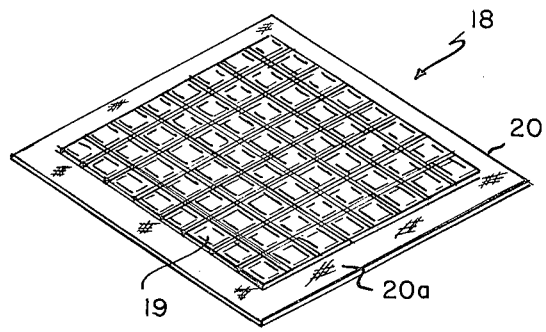
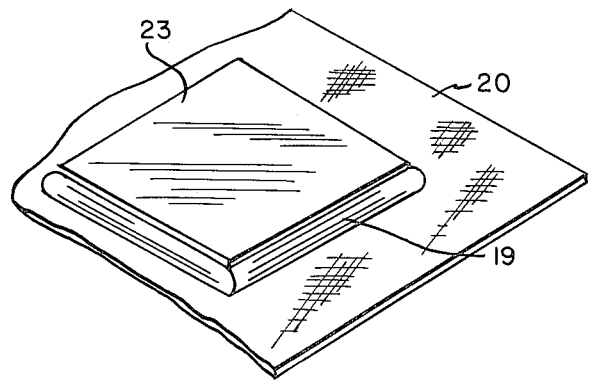
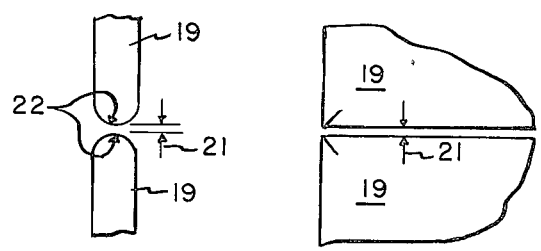
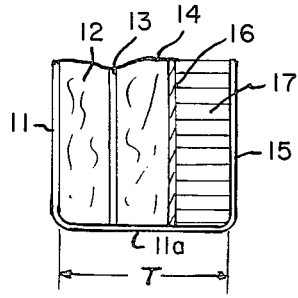
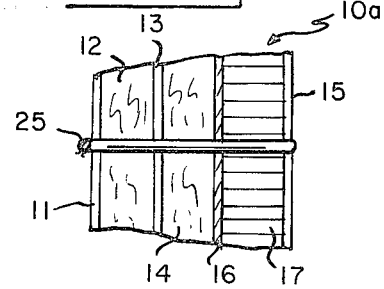

FRAGMENT SUPPRESSION CONFIGURATION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the field of ballistic shields used to protect personnel and equipment, and parked aircraft and/or vehicles, from injury and damage by fragments, projectiles and other missiles being produced as a result of various explosions during combat operations.

It has long been a principal goal of certain military research and development to devise a simple, lightweight and yet reasonably effective type of ballistic clothing or shield, such as the armored vest worn by infantrymen or the so-called "flak" suit of the airman. Naturally, any such clothing or shield device must always represent a reasonable compromise between the additional weight involved in the use thereof and its relative effectiveness in successfully suppressing or reducing penetration by flying fragments, projectiles and the like. In this connection, the ballistic shield to be used may be designed either to be completely "bulletproof", or, alternatively, to resist bomb or shell fragments, for example. Of course, the former would require enlarging the shield, as by the thickening thereof, with an increased number of laminations, components or layers used, or it would require the utilization of a heavier and more resistant type of armor material. However, one objective is to have a reasonable protection at a minimal weight consistent with the ability thereof to successfully perform the assigned mission, as in the case with the aforementioned infantryman's armored vest or airman's flak suit.

Previous experience in the same field of the present invention has shown that, although a given material may be quite effective in stopping fragments or projectiles, in doing so, it may itself generate dangerous particles. Therefore, it is clear that the effectiveness in initially resisting penetration of such fragments or projectiles, for example, cannot be the sole criterion for selecting a material for a protective system. Furthermore, the ability of a selected material, for example, to stop fragments of different sizes, weights and shapes will vary considerably. Thus, a material efficient in stopping large fragments may be relatively ineffective against small fragments. Similar differences in performance have been exhibited by materials in defeating relatively sharp or blunt fragments or projectiles. It is therefore self-evident that the selection of a particular material to stop fragments or projectiles of various sizes and shapes is complex and must always require the previously-noted compromise. This is especially true of a relatively lightweight system, such as is required, for example, for use with the aforementioned infantryman's armored vest or the airman's flak suit, or which is to be used as a temporary covering for aircraft or other vehicles and various equipment in the field.

The unique ballistic shielding device comprising the protective system of the present invention involves a relatively lightweight and comparatively inexpensive means for accomplishing to a significant degree a worthwhile protection to both personnel and equipment, as well as aircraft and other vehicles, during combat operations by the use of rather simplified and yet novel techniques to be further described. In this connection, there have been many attempts in the past to develop such lightweight armor. One example thereof is disclosed in U.S. Pat. No. 3,444,033, wherein there is taught a lightweight armor having "a laminated base member 13 comprising a series of ten layers" and on which is supported "a layer of ceramic tiles" that is covered by a woven fabric material 10, such as nylon. "Separators, composed of paper, masking tape, cardboard, rubber and the like" are used, as indicated at the reference numerals 19-23, between adjacently-positioned tiles to prevent contact therebetween.

In another U.S. Pat. No. 2,789,076, a "laminated ballistic fabric" is used that consists of "layers" of laminated fabric separated by a "relatively soft material, such as soft spun yarn". Finally, a lightweight ballistic helmet is depicted in U.S. Pat. No. 3,320,619 as composed of a "needle-punched nylon felt material 11 interposed between inner and outer layers 10 and 12, both of which are taught as being fabricated from a resin-bonded nylon fabric laminate structure." In this connection, although the present invention makes use of most, if not all, of the same basic materials already disclosed in the prior art as is evidenced by the aforementioned patents; nevertheless, the disclosure to be set forth hereinafter will clearly teach the use of such well-known materials in a novel combination also involving other uniquely combined elements that provide for a significant and improved type of ballistic shielding means for accomplishing the requisite fragment suppression, as will readily appear hereinbelow in the following summary and detailed description thereof.

SUMMARY OF THE INVENTION

This invention consists in a new and improved fragment suppression-protective system including a ballistic blanket portion arranged in a base-supporting subassembly composed of at least two layers of a felt material interposed with a lamination or ply element, a ballistic cloth envelope enclosing the felt layers and lamination or ply element and thereby simultaneously forming both a cloth back-and-facing-outer cover element, and a prime protective surface preferably of ceramic or tile or other suitable relatively hard material disposed in another separate subassembly and adhesive bonded to the outer cover element-cloth facing. A separate honeycomb element may be inserted in the envelope immediately behind the cloth facing thereof to provide a further energy-absorbing space between the prime protective surface and the first felt layer.

Other objects and advantages of the invention will appear hereinafter from the following disclosure, taken in connection with the accompanying drawings, in which:

BRIEF DESCRIPTION OF THE DRAWING

FIG. 1 is an overall somewhat schematic and assembly view, in planform and partly broken-away, of the new and improved fragment suppression and/or ballistic shielding means or protective system of the present invention;

FIG. 2 is a cross-sectional view, partly broken-away, taken about on line 2—2 of FIG. 1 and more clearly illustrating details of the various layers comprising the fragment suppression and/or ballistic shielding means or protective system of the invention;

FIG. 3 is a top perspective view of the uncovered tile subassembly used as the prime fragmentation penetration-resistant or protective system of the invention;

FIGS. 3a, b and c respectively represent top perspective, and partly broken-away and schematic plan and end views, showing further details respecting the individual tiles comprising the tile subassembly of FIG. 3;

FIG. 4 is another cross-sectional view, taken about along line 4—4 of FIG. 1 and depicting certain details of the novel ballistic nylon coth envelope of the present invention that is uniquely combined with, and used to enclose and thereby integrate certain component layers of the invention into a common subassembly; and FIG. 5 is still another cross-sectional view, taken about on line 5—5 of FIG. 1 to illustrate details of the unique guilting together of certain components of the invention to thereby provide an integral and stronger assembly.

DESCRIPTION OF THE PREFERRED EMBODIMENT

Referring generally to the drawings and, particular, to FIG. 1, the new and improved fragment suppression, shielding device or protective system of the present invention is indicated generally at 10 as being, in a test specimen form thereof, of a rectangular configuration that includes, in a separate subassembly, a first, combined and relatively soft, base-supporting and secondary protective system or blanket portion 10a to which may be attached a second, prime protective system-surface of a suitable ceramic, tile or other relatively hard and brittle sheet form and incorporated in a second, separate subassembly, indicated generally at 18 and to be further described hereinafter. As has been illustrated in a broken-away section of the aforementioned FIG. 1, the first, secondary protective system-blanket portion 10a may be comprised of a series of alternately-arranged and adjoining layers to include, for example, a first, outer face cover element 11, which constitutes the face side of the blanket portion 10a that is to face the incoming fragment, projectile, missile or the like, a first, felt layer 12, an inner lamination or ply 13, a second, felt layer 14 and a second, outer back cover element at 15. Although the foregoing structure could, in a particular application, constitute a relatively simplified form of the present invention, it is preferable that, as a more desirable alternative offering further resistance to incoming fragments, for example, a honeycomb spacer element 16 be inserted between the first, felt layer 12 and the first, outer face cover element 11 as is shown in the said FIG. 1. A sliding plate element 17 for the said honeycomb spacer element 16 is specifically provided to facilitate the insertion of the said honeycomb spacer element 16 in its correct supporting and spacing position against the front side of the first, felt layer 12, Although only a single series of alternately-disposed felt layers, as at 12, 14 and the ply 13 interspersed therebetween, have been illustrated, this is by way of example only, and it is to be understood that more than one series therein may be utilized if desired to offer greater resistance to incoming fragments, for example, or, perhaps, even effectively resist penetration by bullets, without departing from the true spirit or scope of the invention.

Attached by means to be further explained to the face side 11 of the subassembly comprising the blanket portion 10a is the previously-referred to second subassembly-relatively hard and significantly penetration-resistant, prime protective surface 18. As is depicted more particularly in FIG. 3, in its preferred form, the prime protective surface 18 may actually consist of a separate subassembly that includes a plurality of relatively small and preferably square-shaped ceramic tiles 19 that are uniquely installed or mounted in the regular square pattern, clearly indicated, on two layers of a preferably 0.005 inch thick glass cloth fiber, at 20, that has been previously impregnated with a suitable resin material. The tiles 19 are disposed with a slight spacing relative to each other of approximately 0.03 to 0.05 inches on all sides thereof. This spacing is indicated at the reference numeral 21 in FIGS. 3b and 3c. Also, in FIG. 3c, the adjacent tile edges as at 22, are depicted as being configured with a full radius of a value to suit the selected tile thickness for a particular application. After installing the foregoing plurality of tiles 19 on the resinous surface of the double-layered glass cloth 20 over an area of about 18 inches square, for example, and then curing the same by well-known pressure and temperature means, the resin material along the gaps 21 between adjacently positioned tiles is then uniquely cracked to thus give a maximum amount of built-in or inherent articulation to the inventive tile subassembly. The tile-mounted double glass cloth 20 is left with a cloth overlap, as at 20a, or approximately one inch, which overlap is left resin free.

With particular reference to FIG. 3a, and in accordance with the further unique teachings of the present invention, it is noted that each of the tiles 19 are uniquely fabricated with a metal back plate, as at 23, preferably of a magnesium-lithium (Mg—Li) material, which back plates 23 may be adhesive bonded to, and cover the flat area of the respective tile 19. The tile subassembly 18 is then installed in and to the center portion of the face side 11 of the blanket portion 10a with both the Mg—Li backing plates 23 thereof and the overlapping free edges, as at 20a, of the tile-mounting double-layered glass cloth 20 being adhesive bonded thereto. In a test specimen of the instant invention, the overall blanket portion 10a measured approximately 36 inches in length by 24 inches in width, whereas the tiles 19 of the tile subassembly 18 covered the previously-noted area of about 18 inches square with the one-inch overlap of the glass cloth 20 extending further outwardly thereof on all sides, or, in other words, for a total of 19 inches square. With this configuration, therefore, the blanket portion 10a provides a substantial supporting means for the tile subassembly 18 by having an overlap on each side of the tile assembly 18, which in a test specimen thereof, measured about 8½ inches in the direction of its length, and 2⅓ inches in the direction of its width.

Referring particularly to FIG. 2, the previously-described fragment suppression/shielding device or protective system of the invention is again indicated in greater detail generally at the reference numeral 10 as principally incorporating the previously-described first, outer face cover element 11, first, felt layer 12, inner lamination or ply 13, second felt layer 14, the sliding plate element 17 for the honeycomb spacer element 16 and the second, outer back cover element 15. Both the outer face and back cover elements 11 and 15 may, in fact, be integral parts of, and form together a novel ballistic nylon cloth envelope or other suitable envelope material, which, as is illustrated in the detail and at the reference numeral 11a of FIG. 4, may be closed on its bottom surface, and, as seen in the aforementioned FIG. 2, after enclosing both felt layers 12 and 14 and inner lamination or ply 13, terminate in opposite, overlapping and upstanding end portions, as indicated generally at 24, that may be suitably stitched together preferably with nylon thread along two parallel rows as indicated in phantom at 24a and 24b with approximately six stitches per inch being used for this purpose. The aforesaid ballistic nylon cloth envelope comprising the cover elements 11, 15 performs, in addition to its function of enclosing felt layers 12, 14 and inner lamination or ply 13 into what is, in effect, a separate subassembly greatly reinforcing the invention's shield device and facilitating its overall assembly, a second important function; namely, that of providing a reinforced surface, that is, the aforementioned facing side or outer cover element 11, to which the prime protective surface-tile subassembly 18 may be adhesive bonded as described hereinbefore. To complete this separate subassembly, the felt layers 12, 14 and inner lamination or ply 13, as well as the ballistic nylon cloth envelope 11, 15, may be affixed together, as by means of quilting, as at 25 in FIG. 5, at about eight-inch intervals starting four inches in from the edge and using six quilt loops per position. This quilting technique creates the blanket portion 10a into an integral, and therefore greatly reinforced and thus a more penetration-resistant subassembly. In other words, by the various elements comprising the said blanket portion 10a being retained together through use of the ballistic nylon cloth envelope 11, 15 and the described quilting means, separation or delamination between the individual components thereof is made much more difficult on the impact therewith of incoming particles, and the kinetic energy of the latter is, in this novel and yet simple manner, partially absorbed, not only by the material itself but, in addition, by the inherent resistance offered by the quilt loops 25 to layer separation resulting from this unique technique of the assembly of the blanket portion 10a.

As previously noted, in its simplest form and for a particular combat application requiring the lightest weight of all, such as for the infantryman in extremely hot climates, the present invention may be described as merely consisting of the previously-noted layers of felt 12 and 14, which may be constructed from a ballistic nylon material, alternately arranged with the lamination or ply 13, also preferably constructed of nylon cloth, and enclosed in the envelope 11, 15, and, of course, further combined with the previously-described prime protective surface-tile subassembly 18 adhesive bonded to the face side 11 of the said envelope. In its preferred form, the foregoing ballistic nylon cloth envelope 11, 15 may be enlarged to receive in inserted relation therewithin in the front side thereof, the previously-noted honeycomb spacer element 16, together with its attached sliding plate element 17 specifically provided for this purpose. The use of the said honeycomb spacer element or insert 16, which may also be of any other suitable lightweight spacing material, has the effect of, and is expressly utilized to provide a built-in and inherent spacing between the prime protective surface-tile subassembly 18 adhesive bonded to the face side 11 of the said envelope and the frontmost or first felt layer 12. This built-in space offers a two-fold advantage to be further discussed.

With the unique previously-described articulation inherently built into the tile subassembly 18 by specifically providing a slight space between each of the adjacently positioned tiles 19 and cracking the resin impregnating the surface of the double-layer glass cloth 20 (FIG. 3) between the said tiles, a specific inherent tendency to give or recoil somewhat under impact has been expressly incorporated in the tile subassembly 18, such that the relatively brittle nature of ceramic tile for example, tending to shatter on contact with flying fragments and other projectiles or missiles having significant kinetic energy and resulting from exploding devices will be at least partially compensated and the said kinetic energy at least partially absorbed during the said shattering action of the said ceramic tile, or, perhaps, even completely absorbed depending, of course, on the amount of such energy present in the fragment and/or the thickness of the selected tile. In other words, fragments of a given explosive device whose point of ground contact, for example, is at at least a predetermined minimum distance away can be completely absorbed by the prime protective surface-tile assembly 18.

If, however, the kinetic energy of the incoming fragment, for example, is still sufficient to penetrate the tile assembly 18 and thereby shatter one or more of the individual tiles 19 thereof, a considerable portion of the said kinetic energy having, nevertheless, thereby been absorbed, the remaining structure of the inventive fragment suppression device 10 would naturally be available for the further absorption of its remaining energy. Thus, the incoming fragment would enter the honeycomb spacer element 16 and, if, for example, its kinetic energy hadn't been largely depleted by its penetration of the tile subassembly 18, would immediately penetrate all or a portion of the said spacer element 16 and, perhaps, the first layer of ballistic nylon felt 12. Thereafter, depending, on any residual energy that might still remain, further penetration of the inner lamination or ply 13, and, finally, the second layer of felt at 14 and perhaps even the outer back cover element 11 may occur. Naturally, whether a full penetration occurs will depend on the closeness of the exploding device creating the incoming fragments, projectiles, or other missiles, its explosive force, the particular size or shape thereof and whether the fragment is sharp or blunt or, alternatively, happens to be turned with a leading sharp edge thereof striking directly against the face of the inventive fragment suppression device 10.

Although each of the aforementioned alternate layers of ballistic nylon felt 12 and 14 would, of course, offer some inherent resistance to, and thereby absorb a measurable portion of the kinetic energy per se, they also serve a second and perhaps more important function of providing a significant cushion to the prime protective surface-tile subassembly 18 which, naturally, has the effect of providing a positive "give" or, in other words, promotes a substantial recoil action to the tile subassembly 18 that, in itself, would clearly absorb a significant amount of the kinetic energy of any incoming fragments, projectiles or missiles striking thereagainst. Of course, for an explosion at a further distance away, the blanket portion 10a would itself be instrumental in absorbing a measurable amount of the kinetic energy, and even all of it, with regard to any incoming fragments impacting thereagainst. In addition, the present tile subassembly 18 is further significantly improved by the use of the metal back plates 23 that have been previously-described as being preferably of magnesium-lithium and which are adhesive-bonded to the back side of each of the individual tiles 19 positioned in contact with the face side 11 of the blanket portion 10a. Thus, with this novel combination of a plurality of ceramic tiles each reinforced with a metal back plate, the incoming fragment or other object must first penetrate and shatter the ceramic material of the particular tile or tiles, at 19, in contact therewith and thereby have a considerable portion of its kinetic energy absorbed. Then, if any kinetic energy still remains tending to cause the further penetration of the incoming object, the one or more metal backing plates 23 involved would, of course, offer considerable additional inherent resistance to such further penetration and, in doing so, would naturally absorb a significant amount of, and, in many instances, all the remaining kinetic energy. During this action, the aforementioned built-in cushioning effect of the felt layers 12 and 14 and the inner lamination or ply 13 would provide a still further inherent and substantial absorption of the kinetic energy of the incoming fragment, for example. In this connection, the honeycomb spacer element 16 being in contact with the entire front side of the first felt layer 12, through means of the plate element 17 thereof, and of course with the tile subassembly 18 itself through the thickness of the nylon cloth facing side 11, would naturally tend to distribute the force of the impact of any incoming particle with the said tile subassembly 18 over its own relatively enlarged area and thus by its own action as well as the action of the first felt layer 12, for example, uniquely offer a substantial additional resistance to, and thereby also absorb a considerable amount of the kinetic energy of such incoming particles.

Thus, a new and improved lightweight fragment suppression-ballistic shield has been developed by the present invention which may be applied in place of existing armor or flak blankets and made flexible, if desired, and as appropriate by its formation into a series of cojoined sections by any well-known joint means therebetween for disposing on and around and thereby protecting both personnel and equipment, as well as parked aircraft and other vehicles from exploding shell, rocket and mortar fragments, for example. As an additional fringe benefit, the unique combination of the present arrangement also offers considerable advantage for and to replace both existing acoustic and thermal systems without departing from the true spirit or scope of the invention.

We claim:
1. A lightweight projectile suppression/ ballistic shield for protecting personnel and equipment, and parked aircraft and other vehicles from exploding fragments and other projectiles being fired, comprising; a first, relatively soft and base-supporting, secondary protective element composed of a ballistic blanket having at least two relatively enlarged and unbonded layers of a ballistic nylon felt material providing a primary resilient, and auxiliary kinetic energy-absorbing and principal cushioning support means, a relatively narrow, lamination nylon cloth layer interposed between, and thereby providing a partial supporting and separating surface between the said ballistic nylon felt layers, and ballistic nylon cloth back and face side portions constituting an integral part of said ballistic blanket and being in respective contacting relation to and thereby providing for the complete and total support to said nylon felt layers, when taken in concert with the partial support being given thereto by said interposing nylon cloth lamination layer, to thus positively enable and ensure the unbonded configuration of said nylon felt layers; and a second, relatively hard and brittle, primary protective and kinetic energy-absorbing element incorporating a principal fragmentation and other projectile-penetration resistant surface means comprised of a plurality of relatively small and regularly-spaced ceramic or tile elements adhesive bonded to the central portion of the face said portion of said blanket and being shatterable on the impact therewith with a certain predetermined force of fragments and other projectiles of exploding devices for thus absorbing a significant portion, if not all, of the kinetic energy being produced thereby.

2. In a lightweight projectile suppression/ ballistic shield as in claim 1, and a spacer element disposed in contacting and supporting relation, and providing a predetermined and supplementary kinetic energy-absorbing space between said alternately-disposed nylon felt layers and the said plurality of ceramic or tile elements constituting said principal fragmentation and other projectile-penetration resistant surface means; said spacer element further providing reinforcement and thus an increased stability to said nylon felt layers, and ensuring a supplementary cushioning means between said nylon felt layers and said plurality of ceramic or tile elements.

3. In a lightweight projectile suppression/ ballistic shield as in claim 1, said nylon cloth back and face side portions of said blanket incorporating a common, integral bottom end-blanket portion and overlapping, attached upper blanket end-portions collectively forming a ballistic envelope completely enclosing, substantially integrating, and therby reinforcing and forming said alternately disposed nylon felt and nylon cloth lamination layers into a separate subassembly both facilitating its fabrication and increasing its inherent strength and resistance to fragment and other projectile penetration, as well as providing an improved and more stable supporting structure for the adhesive bonding on the said face side portion of said blanket of the said plurality of ceramic or tile elements comprising said second, relatively hard, primary protective element.

4. In a lightweight projectile suppression/ ballistic shield as in claim 1; and a relatively enlarged, single, unitary, resilient, double-layer glass cloth-support having adhesive means incorporated on one surface thereof for the bonding thereto in a regular pattern all of the said plurality of relatively small ceramic or tile elements.

5. In a lightweight projectile suppression/ ballistic shield as in claim 4, wherein said plurality of ceramic or tile elements are positioned on said resilient, double-layer glass cloth-support with slightly spaced relation therebetween on all sides thereof; and said double-layer glass cloth-support incorporating a layer of resinous adhesive material of an articulated configuration along all of the spaces provided between the said plurality of ceramic or tile elements to thereby provide a positive built-in recoil action within the said second, relatively hard and brittle, primary protective element and thus improve its inherent resistance and kinetic energy-absorbing capability to fragments and other projectiles impacting thereagainst.

6. In a lightweight projectile suppression/ballistic shield as in claim 5, wherein each of said plurality of ceramic or tile elements incorporates a separate, magnesium-lithium back plate element adhesive bonded both to the rear of a respective ceramic or tile element and to the said face side portion of said blanket.

* * * * *